Jan. 8, 1963　　　A. H. MOTTU　　　3,072,834
AUTOMATIC PROGRAMMING SYSTEM
Filed Dec. 6, 1961　　　　　　　　　　　　　　7 Sheets-Sheet 1

Fig. 1.

INVENTORS
ANDRE H. MOTTU
ROBERT VIRET
BY　Irwin J. Thompson
ATTORNEY

Jan. 8, 1963 A. H. MOTTU 3,072,834
AUTOMATIC PROGRAMMING SYSTEM
Filed Dec. 6, 1961 7 Sheets-Sheet 2

INVENTORS
ANDRE H. MOTTU
ROBERT VIRET
BY
Irwin S. Thompson
ATTORNEY

Jan. 8, 1963 A. H. MOTTU 3,072,834
AUTOMATIC PROGRAMMING SYSTEM
Filed Dec. 6, 1961 7 Sheets-Sheet 3

INVENTORS
ANDRE H. MOTTU
ROBERT VIRET
BY Irwin S. Thompson
ATTORNEYS

Jan. 8, 1963 — A. H. MOTTU — 3,072,834
AUTOMATIC PROGRAMMING SYSTEM
Filed Dec. 6, 1961 — 7 Sheets-Sheet 4

INVENTORS
ANDRE H. MOTTU
ROBERT VIRET
BY
Irwin S. Thompson
ATTORNEYS

Jan. 8, 1963 A. H. MOTTU 3,072,834
AUTOMATIC PROGRAMMING SYSTEM
Filed Dec. 6, 1961 7 Sheets-Sheet 5

INVENTORS
ANDRE H. MOTTU
ROBERT VIRET
BY Irwin S. Thompson
ATTORNEY

INVENTORS
ANDRE H. MOTTU
ROBERT VIRET
BY Irwin S. Thompson
ATTORNEY

Jan. 8, 1963  A. H. MOTTU  3,072,834
AUTOMATIC PROGRAMMING SYSTEM
Filed Dec. 6, 1961  7 Sheets-Sheet 7

INVENTORS
ANDRE H. MOTTU
ROBERT VIRET
BY  Irwin S. Thompson
ATTORNEY

United States Patent Office 3,072,834
Patented Jan. 8, 1963

3,072,834
AUTOMATIC PROGRAMMING SYSTEM
Andre H. Mottu and Robert Viret, Geneva, Switzerland, assignors to Societe Genevoise d'Instruments de Physique, Geneva, Switzerland, a corporation of Switzerland
Filed Dec. 6, 1961, Ser. No. 157,541
10 Claims. (Cl. 318—162)

This invention relates to the art of automatic programming systems for selectively positioning movable supports and is particularly concerned with automatic controls of the "servo-mechanism" type which can be used with machine tools having a movable member to selectively and precisely repeatedly position such movable member.

The art of automatic programming and control systems for machinery has been highly developed over many years, and workers in the art have been provided with various suggestions as to how basic mechanical, electromechanical, electro-optical, and electronic circuits and expedients can be incorporated into machine tool control systems to provide for automatic adjustment of movable tool components. The present invention represents an improvement over prior art systems, incorporating in a novel and selective combination many of the well-known expedients of the aforementioned type.

In order to facilitate ready comprehension of the invention, the basic operations to be controlled and known prior techniques and devices are discussed initially hereinbelow.

On many types of machine tools, such as jig-boring machines, coordinate grinding machines, and the like, it often becomes necessary to produce a group of components, all of which are identical. For example, a machinist may be called upon to produce a bar of a predetermined length having spaced apart bores therein at precise locations. To manufacture such a bar, a machinists could use a conventional drill press having a carriage movable under a reciprocally mounted drill bit. The carriage would have an index thereon, and the machine would be tied with an index whereby the machinist can move the carriage so that the pointer corresponds with a given index position representing one location where the drill bit is disposed above a point at which a bore is to be provided in the bar. After moving the carriage to this location, the machinist would lower the drill bit, thereby drilling a bore. Next, the machinist would move the carriage to another location where the pointer on the carriage was aligned with a proper index mark, and another bore would be drilled. This procedure would be repeated until the bar was provided with the desired number of bores at the desired locations. Once one bar was completed, the machinist would remove such bar, place another bar in the apparatus, and repeat the carriage adjustments and drilling until the second bar was fabricated. The same procedure would be carried out over and over until all of the necessary components were fabricated as required. Basically the same procedure would be followed regardless of the type of tool used, or component to be produced.

Due to the time required for manual adjustment, and due to the fact that manual operations are inherently somewhat inaccurate, many machine tools have been provided with some means which serves to automatically position the carriage at a plurality of predetermined positions. Such means eliminate the manual operation described in the preceding paragraph and, in some instances, provide for automatic movement of the carriage from position to position as the desired operations at any position are completed. In other words, various types of devices and/or systems have heretofore been suggested which can be incorporated on a machine tool so that the machine tool can be set, whereby the movable carriage or member thereof automatically moves to a plurality of "repeat positions" in handling workpiece after workpiece. (In the illustration used hereinabove, such machine tools would move a bar automatically from location to location as each bore was provided therein, and when a new bar was put on the machine, the operation would repeat, moving the new bar from preset position to preset position.)

Some of the prior devices used for controlling the movable carriage or member of a machine tool whereby it travels automatically from "repeat" position to "repeat" position incorporated stops adapted to be fastened manually on the carriage or movable member, which stops served as "preset" guides cooperating with switches or abutments governing movement of the movable carriage or member. Such prior devices or systems presented problems not only because of the difficulty of setting the stops in exact location, but also because the space available for working with the stops is limited.

While some developments in the prior art centered about the use of stops, other developments were concerned with utilization of electronic memory systems adapted to store signals corresponding to the "repeat positions." Signals used in such systems control electromechanical conversion components which automatically reset the movable member or carriage of a machine tool in a "repeat position." The earlier developed systems falling within this general category incorporate means for generating a signal having a phase representative of a given position, and use such signal as modulation on a carrier wave adapted itself to be stored on magnetic tape, or adapted to facilitate storing of the phase-regulated modulation carried thereby on magnetic tape. Systems utilizing the 'phase regulated" modulation signals operate with waves of generally sinusoidal form of comparatively low frequency, and thus necessitate the utilization of separately developed high frequency signals to achieve accurately recordable and reproducible "repeat position" indications.

Later developments in the art utilizing electronic equipment for automatic control of "repeat positions" of a machine tool incorporate binary storage systems and digital to analog converters for performing desired operations. The "binary and digital to analog converter" systems preset the "repeat positions" by means of a keyboard and coder which record desired information on a magnetic drum. While the "binary type" system may provide more accuracy than the "phase modulation" systems in the ultimate positioning of the movable member or carriage of the machine tool, such systems require complicated electronic equipment and in addition, in most instances, a skilled electronic technician as an operator, and not an ordinary machinist.

In addition to having suggestions as to how repeat positions may be predetermined by mechanical stops, and suggestions as to how electronic signals may be utilized for purposes of automatically governing the "repeat positions" of a machine tool carriage, the prior art contains various suggestions as to the manner in which optical means can be used for purposes of accurately positioning a movable scale having index marks thereon. The optical systems generally incorporate some means for focusing an image of an index mark onto a photocell in a controlled manner, whereby such image causes the photocell to produce an output variable to a predetermined level or sequence representative of a predetermined position of any index. The optical means are desirable for fine control, and are more precise in operation than other systems suggested, but optical systems are not suitable for control of any extended movement of a machine tool carriage or for coarse adjustment thereof.

Thus, while the prior art contains many suggestions as to different types of automatic programming systems for repeatedly positioning a movable support, and a multiplicity of suggestions as to different types of components and arrangements which can be used for certain positioning operations, the industry is constantly in search of improved systems which eliminate some or all of the aforesaid disadvantages.

Accordingly, a primary object of the present invention is to provide an automatic programming system for selectively repeatedly positioning, at a plurality of exact locations, a movable support, which system permits accurate presetting of the repeat positions regardless of space limitations, which system utilizes only basic, non-modulated signals, which system does not require complicated electronic computer type expedients, and which system permits, in the final adjustment, obtaining extreme accuracy such as that which can be achieved through the utilization of optical expedients.

More specifically, a primary object of the present invention is to provide an automatic programming system for selectively repeatedly positioning, at a plurality of exact locations, a movable support, which system incorporates in a novel and selective manner, phase comparison type means preferably operating with pulses for causing a coarse adjustment of the support, and optical means producing electrical signals for causing fine adjustment of the support.

Still a further, yet even more specific object of the present invention is to provide such an automatic programming system wherein selectively adjustable optical indexing means are incorporated, as well as an auxiliary programming system for automatically moving the optical indexing means from preset position to preset position whereby extreme accuracy can be achieved even in instances where there is a fractional differential spacing between a series of repeat positions.

Still a further, yet even more specific object of the present invention is to provide an automatic programming system conforming with the preceding objects and incorporating control means responsive to the output of the coarse adjustment section of the system for (a) disconnecting the coarse adjustment section from the drive section of the system and (b) coupling the fine adjustment section of the system to the drive section thereof.

An even further, yet important object of the present invention is to provide an automatic programming system of the aforesaid type, which programming system incorporates a drive section having means for moving the support to be positioned at different speeds depending on the proximity of the support to an exact repeat location. In this connection, an even more specific object of the present invention is to provide such a drive section which includes first and second motors operating through a gear box-type speed reducer to provide for fast coarse adjustment, then a relatively slow fine adjustment, and then an even slower ultimate fine adjustment as the movable support approaches exact alignment with a repeat position.

Still an additional, and further object of the present invention is to provide an automatic programming system conforming with all of the preceding objects, wherein the optical indexing means incorporated therein includes a micrometer-type preset means, and an oscillating mirror-type scanning means adapted through the utilization of a photocell, to produce vernier electrical signals having a time sequence variable as a function of the distance between a given index mark on the movable support and a preset "alignment" position thereof.

According to the preferred embodiment of the invention, the automatic programming system provided hereby serves to repeatedly selectively position, at a plurality of exact locations, a movable support carrying indices thereon. The system comprises the combination of selectively operable power means for moving the support at coarse and slower fine adjustment speeds, generator means coupled with the movable support for developing electrical signals, preferably of pulse form, having a phase angle that is a function of the instantaneous position of the movable support, memory means for reproducibly storing electrical signals, phase comparison means for producing an error voltage which is a function of the phase difference between two series of electrical signals fed thereto, switching means for coupling the generator means to the memory means to record on the memory means a repeat position series of electrical signals, and for coupling the generator means and the memory means to the phase comparison means to feed to the phase comparison means a series of instantaneous position signals from the generator means and the repeat position series of signals from the memory means. The system further includes index means for defining a "zero position" of the indices, reading means for producing vernier electrical signals having a characteristic which is the function of the position of the indices relative to the zero position, detector means responsive to the vernier signals for producing an output signal having a magnitude proportional to variations in the characteristic, and control means coupling the phase comparison means and the detector means with the power means. The control means is responsive to the error voltage produced by the phase comparison means and to the output signal produced by the detector means for connecting the phase comparison means with the power means for driving the support at a coarse adjustment speed until the error voltage reaches a predetermined minimum value, and then connecting the detector means to the power means for driving the support at fine adjustment speed until the output signal reaches a predetermined minimum value.

In addition to the foregoing, the preferred system provided hereby further includes a means for stopping the support at an exact location and an auxiliary automatic programming system for repeatedly positioning the index means, which auxiliary automatic programming system comprises essentially a duplicate arrangement to that used for coarse adjustment of the support proper.

The invention will be better understood, and objects other than those specifically set forth above will become apparent when consideration is given to the following detailed description. Such description refers to the preferred and illustrative embodiments of the invention presented in the following figures wherein.

*Over-All System*

As suggested hereinabove, the present invention lies in the provision of a combination of conventional elements connected and coacting to provide, in a novel and selective combination, for automatic positioning of the movable member, usually a carriage or table, of a machine tool.

Figure 1:
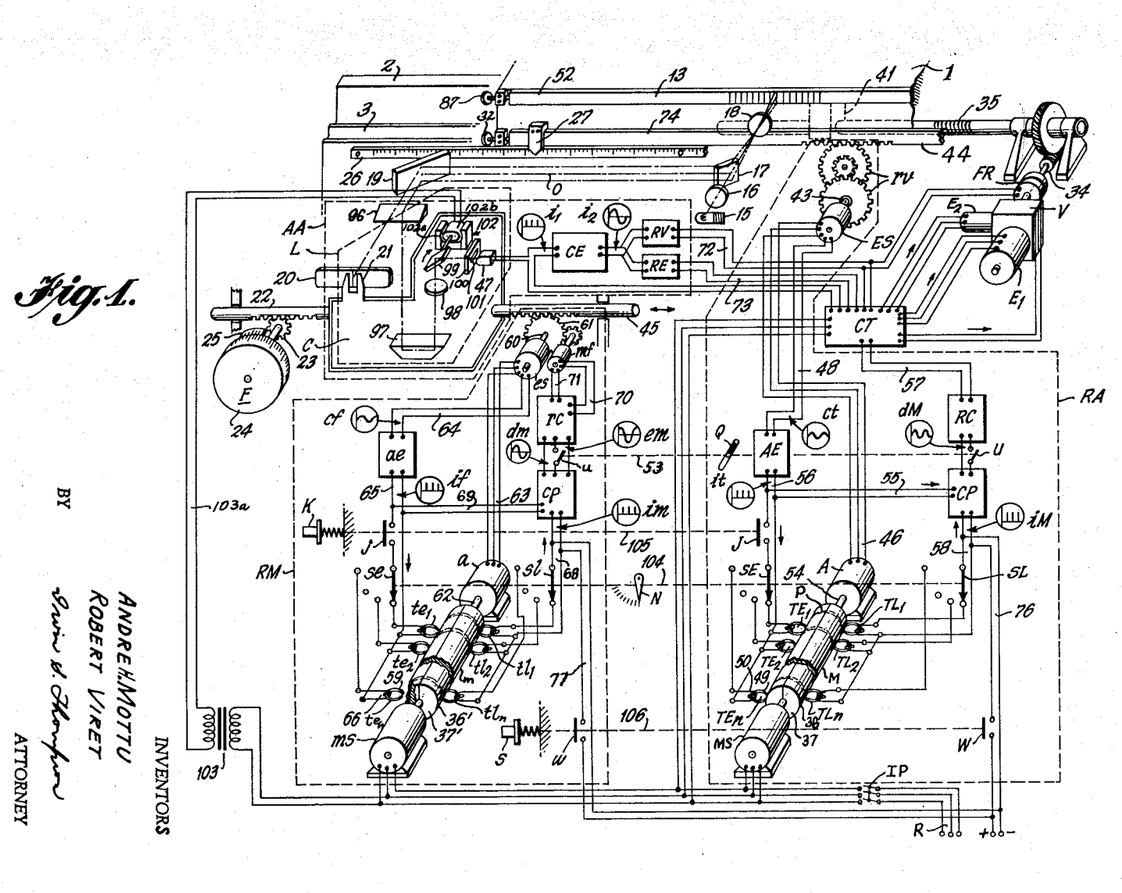
FIGURE 1 is a schematic circuit diagram of an overall system constructed in accordance with the invention, and presents schematically the components incorporated therein and the relative cooperation therebetween.

In FIGURE 1, which presents the overall automatic programming system provided hereby, the movable member is shown as a movable support 1 carrying a scale 13 having indices thereon. Coupled directly through suitable gearing with the support is a conventional selectively operable power means adapted to move the support at coarse and slower fine adjustment speeds. A generator means comprising a phase sensitive sine wave generator ES and a pulse-forming circuit AE is coupled to the movable support through the speed reducer $rv$ and rack gear 44. Such generator means serves to develop first sinusoidal electrical signals $ct$ and then pulse signals $it$ having a phase angle that is a function of the instantaneous position of the movable support. A memory means, including a rotatable memory member M having a magnetic surface thereon and a plurality of recording and reproducing heads $TE_1$-$TE_n$ and $TL_1$-$TL_n$ cooperating with the member M, is provided for reproducibly storing electrical signals $it$. Each recording and reproducing head comprises a magnetic circuit 49 carrying an excitation winding 50 and presenting an air-gap located at the proximity of the surface of the memory member M. Phase comparison means CP is provided, and this phase comparison means produces an error voltage which is a function of the phase difference between two series of electrical signals fed thereto. Switching means including the switch J, the switch U, and the selective switches SE and SL is incorporated in the system for coupling the generator means to the memory means to record on the memory means a repeat position series of electrical signals and for coupling the generator means and the memory means to the phase comparison means to feed to the phase comparison means a series of instantaneous position signals $it$ from the generator means and a repeat position series of signals $im$ from the memory means.

Index means generally designated by the numeral 21 is included for defining a zero position of the indices, and such index means cooperates with a reading means including the oscillating mirror 99 and photocel 47 for producing vernier electrical signals $i_1$ having a characteristic which is a function of the position of the indices relative to the zero position. A detector means CE is incorporated, and this detector means is responsive to the vernier electrical signals produced by the reading means and serves to provide an output signal $i_2$ having a magnitude proportional to variations in the characteristic of the vernier signal which is a function of the position of the indices relative to zero position.

Further, the system includes control means comprising the switching system generally designated as CT, the amplifier RC and the current sensitive relays RE and RV. Such control means couples the phase comparison means CP and the detector means CE with the power means, and is responsive to the error voltage $dM$ produced by the phase comparison means CP and the output signal $i_2$ produced by the detector means CE for connecting the phase comparison means with the power means for driving the support 1 at coarse adjustment speed until the error voltage reaches a predetermined minimum, and then connecting the detector means CE to the power means for driving the support at a fine adjustment speed until the output signal reaches a predetermined minimum value.

Index means and reading means contained within phantom box AA are supported on a suitable frame C which is fixed on the longitudinally adjustable rack 45. As explained in more detail below, the index means and reading means are selectively adjustable so as to preset an exact repeat position. In order to suitably locate the index means and reading means for any given repeat position, an auxiliary programming system is provided. The auxiliary programming system includes an auxiliary power means comprising the motor $mf$ and associated gearing 61 for moving the rack 45 and frame C attached thereto. Auxiliary generator means including the phase sensitive sine wave generator $es$ and pulse network $ae$ is coupled to the index means, or rack 45 thereof for developing electrical signals $cf$ and $if$ respectively having a phase angle that is a function of the instaneous position of the index means. Auxiliary memory means including the memory member $m$ and recording and reproducing heads $te_1$-$te_n$ and $tl_1$-$tl_n$ is incorporated for reproducibly storing electrical signals. Each recording and reproducing head comprises a magnetic circuit 59 carrying an excitation winding 66 and representing an air-gap located at the proximity of the surface of the memory member $m$. Auxiliary phase comparison means $cp$ are incorporated for producing an auxiliary error voltage $dm$ which is a function of the phase difference between two series of electrical signals fed thereto. Auxiliary switching means including the switches $j$ and $u$ and selector switches $se$ and $sl$ serve to couple the auxiliary generator means to the auxiliary memory means to record on the auxiliary memory means a repeat position series of electrical signals and to couple the auxiliary generator means and the auxiliary memory means to the auxiliary phase comparison means to feed to the auxiliary phase comparison means a series of instantaneous index means position signals $if$ from the auxiliary generator means and the repeat position series of signals $im$ from the auxiliary memory means. Auxiliary control means including a switching type amplifier $rc$ serve to control operation of the power means $mf$ in response to the auxiliary error voltage $dm$.

Having now presented generally the components of the overall system provided hereby, attention will be directed to the details of such components, as well as the specific operation thereof.

Figure 13:
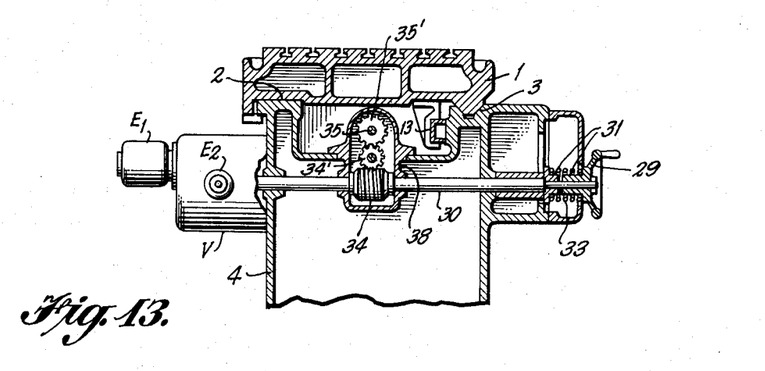
FIGURE 13 is a sectional view taken on the line 13—13 of FIGURE 11, and presents the details of construction and cooperation between the motor drive and manual drive for the movable carriage or table of the machine presented in FIGURE 9.

The movable support 1 which is to be positioned, is, in a conventional manner, adapted to move back and forth along the rails 2 and 3 upon rotation of a suitable lead screw 35 provided for causing such movement. The lead screw 35 cooperates with a threaded block 41 secured to support 1, also in a conventional manner, and the lead screw 35 is operated by the power means, including motors $E_1$ and $E_2$, gear reduction box V, brake FR and worm 34. The power drive is selectively operable and adapted to cause rotation of the lead screw 35 through the conventional coaction of worm 34 with a sprocket 33 (FIG. 13) drivingly carried by the lead crew 35. The apparatus illustrated, and which is controlled by the system of the invention, is thus of a well-known machine tool type incorporating basically a movable support and a drive for moving such support back and forth between two end positions, namely, a left-end position and a right-end position.

In order to provide for automatic control of movement of the support between the end positions, the programming system hereof utilizes electrical signals, optical signals, and electro-mechanical and electronic equipment responsive to such signals.

*Coarse Adjustment*

For producing electrical signals corresponding to the instantaneous location of the support 1 between the two end positions, a suggested above, the support carries a rack gear 44, and the programming system includes a signal generator cooperating with the rack gear. The rack gear cooperates with speed reducing gears $rv$ to adjust the signal-generating means ES whereby such signal-generating means produces a sine wave having a phase representative of the instantaneous position of the movable support. More specifically, if the support is moved to its right-end position, for example, then the signal produced by the generator ES is in phase with a predetermined standard. As the support is moved from the right-end position to the left-end position, the phase of the signal generated by the generator ES varies from in-phase to 180° out of phase with the standard. Accordingly, the phase angle of the signal generated by the generator ES varies from 0° to 180° as the support is moved between the two extreme end positions, and a signal having any predetermined phase angle is thus directly representative of a predetermined linear instantaneous position of the support.

The signal generator ES preferably comprises a conventional phase shifter having a three phase field and a signal generating rotor movable therein. The rotor moves with the shaft 43 carrying a speed reducing gear $rv$ thereon, and accordingly with the speed reducing gear arrangement $rv$ which is operated through movement of the rack gear 44. The rotor of the phase shifter or generator ES serves to provide a sine wave output on the leads 48, which output appears as $ct$. Signals produced by the phase shifter or signal generator ES, as explained in more detail below, are synchronized with signals reproduced from the memory means so as to allow for a proper phase comparison by the phase comparison means CP. Various types of phase shifters may be utilized for component ES such as, for example, the type shown in "Fundamentals of Vacuum Tubes," second edition, Eastman, McGraw-Hill, p. 224, and the type shown in United States Patent No. 2,760,131 issued August 21, 1956.

When it is desired to store signals representative of repeat positions to which the support 1 is to be moved in repeated operations, then the support is moved to the "repeat position" and a signal generated by the generator ES is passed, after being shaped into a "pulse," to the magnetic storage drum generally designated by the letter M. The sinusoidal signal $ct$, generated by ES is transformed, according to the invention, from its sinusoidal form into the pulse form shown in the drawing as $it$, and the pulse signal $it$ is recorder on the surface of the drum M. Thus, the generator ES and shaping network AE serve together as a generator means for producing pulses having a phase angle representative of the instantaneous position of support 1. The phase of the sinusoidal signal $ct$ is representative of the "repeat position" to which the table has been moved for recording the position to be stored, and the device AE which transforms the sinusoidal signal into a pulse signal produces pulses having a phase angle or displacement corresponding to the phase angle of the sinusoidal wave produced by the generator ES.

Device AE which converts the sinusoidal signal $ct$ into the pulses $it$ can be of any conventional form. For example, it may take the form of the network shown in "Radar Electronics Fundamentals," War Department, June 29, 1944, at page 170, or alternatively, it can be a pulse shaper such as that incorporated in the system shown in United States Patent No. 2,774,872.

The pulse signal or pulses leaving the device AE are passed through magnetic heads $TE_1$, $TE_2$, ... $TE_n$, depending on which of such heads is connected with the device AE through selector switch SE, whereby the connected magnetic head records the pulse signal or pulses $it$ on one channel of the magnetic memory drum M upon actuation of switch J. After pulse signals representing one repeat position are recorded on the magnetic drum in one channel P thereof, then the support 1 is moved to a "repeat position," and a new signal is generated by the generator ES, which new signal is transformed into pulse form by network AE and recorded on a different channel of the magnetic memory M in the same manner as described above. This operation can be repeated as many times as required. After all of the signals of the "repeat positions" are stored on the magnetic drum, then the machine control system provided by the invention can be used to automatically repeatedly position the support.

The memory member M can take any suitable form, but preferably comprises an elongated cylindrical base 37 having a magnetic layer 36 covering the periphery thereof. In conventional manner, a plurality of series of signals can be stored on the surface 36 by disturbances induced therein through the recording series of magnetic recording heads $TE_1$, $TE_2$, ... $TE_n$. The magnetic recording heads are also of conventional design, and are disposed in spaced apart relation so as to be positioned to record signals on respective spaced apart so-called "channels" P. The reproducing series of magnetic heads $TL_1$, $TL_2$, ... $TL_n$ are also of conventional design, and are adapted to "pick-up" the disturbances in the respective channels P.

The memory member M is driven by a suitable drive motor MS connected to the three phase supply R through the system switch IP. It is to be understood that various types of memory members and drives therefor can be used without departing from the scope and spirit of the invention, and that the particular form of memory member, recording or pick-up heads associated therewith, and drive motor therefor, in and of itself forms no part of the instant invention.

Now, assume the switch IP is closed, the memory member M is rotating under the action of drive motor MS therefor, and the motor $E_1$ is connected by the control switching box CT with the power line R. Also assume that the support 1 is returned to its right-end position, and a component to be fabricated is locked thereon in a conventional manner. With the motor $E_1$ connected with the power lines, the support will be in movement toward the left as shown, and as the piece moves, the signal generator ES produces a sinusoidal wave $ct$ having a phase displacement indicative of the instantaneous location of the support. This signal is fed to the electronic pulse shaping network AE and there converted into the pulses $it$. The pulses are not, however, fed to the magnetic memory member M now, as they were during the recording operation. (During recording, the support 1 was in a set position and a pulse sequence was stored. Now the support is moving, and ES is producing signals of continuously changing phase.)

The pulses generated by the device AE during automatic operation of the programming system to move the support to a repeat position are fed via the line 55 to the phase comparator CP. Also fed to this phase comparator are pulses $iM$ which were previously stored on the magnetic memory member M. The pickup heads $TL_1$, $TL_2$, . . . $TL_n$ can be alternately selectively connected to the phase comparator through selector switch SL so as to feed the desired series of repeat position pulses to the phase comparator. Assuming the head $TL_1$ to be connected, pulses recorded on the magnetic memory member M are passed through the head $TL_1$ and to the phase comparator CP via the line 58. Thus, the phase comparator receives a series of pulse signals $iM$ having a recorded or stored phase position. Also, the phase comparator receives a series of pulse signals $it$ having a phase position representative of the instantaneous position of the support 1. The phase comparator CP is designed to compare the phase of the recorded pulse signals $iM$ with the phase of the instantaneous pulse signals $it$ supplied from the generator ES through the pulse forming device AE. As the two pulse signals $iM$ and $it$ received at the phase comparator are compared, there is produced an output signal in the form of a sinusoidal wave $dM$ having a magnitude proportional to the phase difference between the two pulse signals fed to the phase comparator CP. As the phase difference between such two pulse signals approaches zero, the magnitude of the sinusoidal output signal $dM$ decreases. Thus, the phase comparator produces an output signal proportional to the difference in phase between the two series of input pulses fed thereto.

The phase comparator CP, like other electronic expedients incorporated in this system, may be of any conventional design which will produce the desired result. For example, the phase comparator may be of the general type presented and discussed in United States Patent No. 2,579,286, of the general type presented and discussed in United States Patent No. 2,861,345, or of the general type presented and discussed in United States Patent No. 2,774,872. Preferably, however, the phase comparator takes one of the conventional forms shown in FIGURES 2(a) through 2(d) inclusive. If reference is made to FIGURE 2(a), it will be noted that the phase comparison means shown therein comprises five sections designated respectively by the numerals 300–304, inclusive. The sections are separated for explanatory purposes by dotted lines, and the connections of the alternative circuits of FIGURE 2 with the overall system presented in FIGURE 1 are designated by corresponding numerals to those used in FIGURE 1. The section 300 of the phase comparison means of FIGURE 2(a) comprises a bistable multivibrator (flip-flop) type circuit such as that presented in British Patent No. 148,582. Section 301 comprises a conventional form of filter such as that shown in United States Patent No. 1,227,113 whereas section 302 comprises a conventional "chopper" or polarized type switching relay. The switching relay of section 302 is operated by means of a conventional oscillator such as that shown and described in United States Patent(s) issued to De Forest in 1912. The output of the phase comparison means of FIGURE 2(a) is taken through another filter arrangement, also of conventional design, such as, again, that shown in United States Patent No. 1,227,113.

Figure 2A:
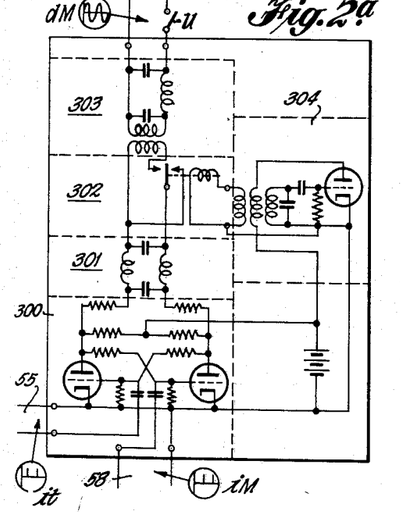
FIGURES 2a through 2d, inclusive, are schematic circuit diagrams of the exemplary phase comparator networks which can be incorporated in the coarse adjustment section of the system of FIGURE 1.
Figure 2B:
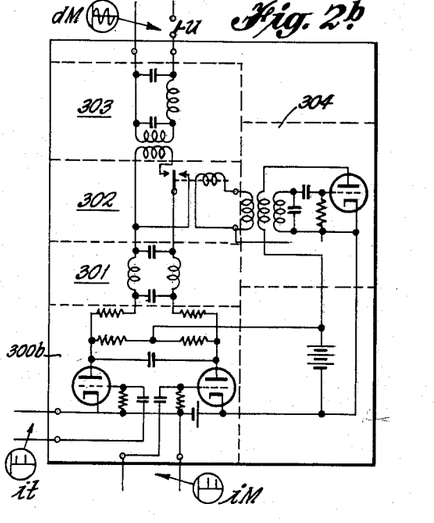

The phase comparison means presented in FIGURE 2(b) corresponds substantially with that shown in FIGURE 2(a), however the bistable multivibrator of section 300 of the phase comparison means of FIGURE 2(a) is replaced in FIGURE 2(b) by a thyratron type bistable multivibrator such as that shown and described in United States Patent No. 2,149,487. The remaining sections of the phase comparison means of FIGURE 2(b) correspond identically with corresponding sections of the phase comparison means of FIGURE 2(a). Due to the similarity in arrangement, the input section of the phase comparison means of FIGURE 2(b) has been designated by the numeral 300(b) thus indicating the corresponding relation between this section and the section 300 of the phase comparison means of FIGURE 2(a).

Figure 2C:
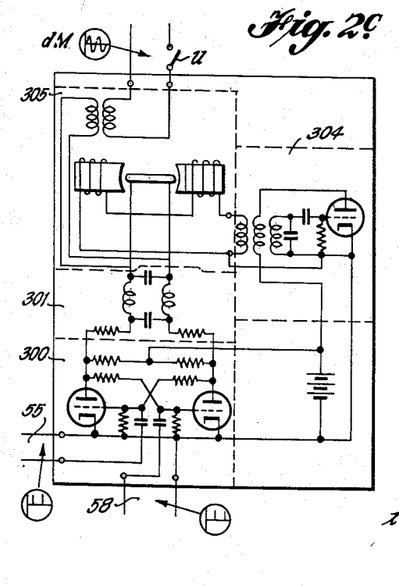

The phase comparison means of FIGURE 2(c) is also similar to the other phase comparison arrangements discussed above. Instead of using a filter and polarized relay output unit comprising sections 302 and 303 as shown in FIGURES 2(a) and 2(b), the system of FIGURE 2(c) utilizes an electromagnetic chopper section generally designated by the numeral 305. The components and system of this section 305 are shown and explained in United States Patent No. 2,486,641. It will be noted that section 304 of the system of FIGURE 2(c) corresponds to section 304 of FIGURES 2(a) and 2(b).

Figure 2D:
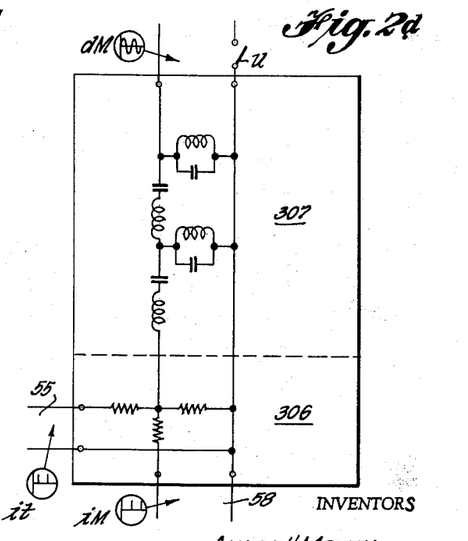

The system of FIGURE 2(d) differs from the system of FIGURES 2(a) through 2(c) inclusive in that the system of FIGURE 2(d) is based on British Patent No. 646,215. The system of FIGURE 2(d) comprises an input resistance bridge type network which is coupled as shown with a filter network. The input resistance network per se is based on the aforesaid British Patent No. 646,215, whereas the filters incorporated in the section 307 of the system of FIGURE 2(d) are constructed in accordance with United States Patent No. 1,227,113.

The foregoing are but examples of the various types of phase comparison means which can be used for the component designated as CP, and it should be understood that any suitable phase comparison means may be incorporated without departing from the scope and spirit of the invention.

The important factor is that the phase comparison means serve to compare the phase of the signals delivered thereto via the line 55 from the pulse shaping network AE and the signals delivered thereto via line 58 from the memory member M, and by virtue of such comparison, produce an output signal proportional to the phase difference between the series of signals being compared. The output signal from the phase comparison means CP is shown in FIGURE 1 as $dM$ and this output signal is in essence an "error voltage." Accordingly, it is hereinafter referred to as "the error voltage."

The error voltage $dM$ is fed through a conventional amplifier RC which serves to control a conventional type relay switch to stop the motor $E_1$ or disconnect the motor $E_1$ from the power supply, when the phase difference between signals being compared by the phase comparator CP is below a predetermined value, as represented by the output signal $dM$ reaching a predetermined value.

Figure 3:
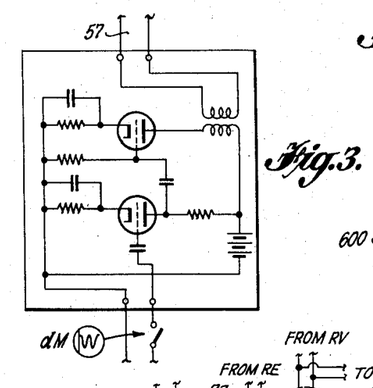
FIGURE 3 is a schematic circuit diagram of an exemplary type amplifier which can be incorporated in the coarse adjustment section of the system of FIGURE 1.

The amplifier RC again, like other electronic components incorporated in the system hereof may be of any suitable form. The preferred form of amplifier network, however, conforms with that shown in FIGURE 3, i.e. it is a conventional two-stage resistance-capacitance coupled amplifier such as shown and described in United States Patents Nos. 841,387 and 879,532. It will be noted that in FIGURE 3 the input lines are shown schematically as receiving the error voltage $dM$ and the output lines are designated by the numeral 57. As shown in FIGURE 1, the output lines 57 are coupled with the switching control device CT, to which reference is made in more detail hereinbelow.

Because the instantaneous signals generated by the generator ES are to be compared, after transformation into pulses by the device AE, with the pulses stored on the magnetic memory member M, it is desirable to provide a positive synchronization between the memory device member M and the signal generator ES. To achieve such synchronization, the invention provides for the utilization of an alternator A coupled with the magnetic memory member M and driven through shaft 54 by the memory means motor MS. Alternator A is adapted to establish a field in the signal generator ES from which the instantaneous signal generated by ES is derived. The alternator A is therefore responsible for the rate of production of signals transmitted from the signal generator ES. Thus, the rate at which the magnetic memory member M is driven, and thereby the rate at which signals are picked up by the heads $TL_1$, $TL_2$, ... $TL_n$ for reproduction corresponds exactly with the rate at which signals are generated by the signal generator ES serving in operation to provide instantaneous table position signals. In other words, means are provided to synchronize the frequency of pulses $it$ and $iM$.

The alternator A and phase shifter ES comprise a conventional synchronous signal type generating system which may take any desired from such as, for example, the form of synchronous signal generating system shown and described in United States Patent No. 2,760,131. The particular form of synchronous signal system used is not important to the instant invention, but it is important to provide some means of synchronization. Preferably, however, a three phase system is used, and the field of the alternator A is coupled through the lines 46 with the field of the phase shifter ES so that the instantaneous position signals are synchronized with the "memorized" signals picked up from the memory means.

The system described immediately hereinabove, and including the phase generator ES, the pulse network AE, the memory member M and associated heads, the phase comparator CP, and the amplifier RC as well as the motor $E_1$, serves to provide or automatically produce a coarse or approximate automatic adjustment of the support 1. This is done, as should be appreciated from the foregoing discussion, by generating a sinusoidal wave having a phase representative of the position of the support, converting such signal into pulse form, recording such signal, and thereafter comparing the recorded signal with an instantaneous signal in pulse form to produce a sinusoidal output which is used to control the drive motor $E_1$. Since the instantaneous signals generated by the generator ES have a phase representative of the instantaneous position of the support 1, and since there was previously recorded a series of signals having a phase representative of the "repeat position," the comparison of the two signal series as the support moves to a "repeat position" provides a means of automatically adjusting the support. It will be noted that pulse signals are stored, not modulated sinusodial signals, and that pulse signals are compared. Moreover, it should be understood that the phase comparison technique used in the coarse or approximate adjustment portion of the system provided by the invention, and described in detail hereinabove, moves the support to a preselected location only within a limited accuracy.

More specifically, with the system described, a 180° phase change may correspond with, for example, a 180 cm. displacement of the table. Thus, a difference of 1° in phase, a small phase difference as appreciated by those of ordinary skill in the art, would be representative of a 1 cm. change in position. Accordingly, while the phase system, or coarse adjustment system, described above serves to automatically position the support at preselected repeat positions, the same is of limited accuracy. Thus, the system of the invention contemplates the utilization of a fine adjustment system in combination with a coarse adjustment system.

*Basic Electro-Optical Fine Adjustment*

The fine adjustment system utilized in accordance with the preferred embodiment of the invention, and shown in FIGURE 1, may generally be referred to as of the "electro-optical type."

The optical portion of the electro-optical fine adjustment system comprises a scale 13 carried by the movable support 1 and having a plurality of index marks or lines thereon, and a series of lenses and mirrors disposed to direct an image of any given index mark on scale 13 to preselected locations. More specifically, a bulb or other suitable light source 15 is disposed in front of the scale 13, and the light issuing therefrom is passed through a focusing lens 16, a semi-transparent mirror 17, and a focusing lens 18 onto an index mark of the scale 13. The reflection of such index mark is transmitted backwardly through the focusing lens 18 and onto the mirror 17, whereupon it is reflected longitudinally of the support to a mirror 19. The image being passed to the mirror 19 and reflected therefrom can pass from the mirror 19 through a prism 96 or onto an image screen 20. The signal passing through the prism 96 travels to reversing prism 97 and then through a focusing lens 98 onto an oscillating mirror 99. The oscillating mirror has a central axis which corresponds to the central axis or movable index 21 of the screen 20, whereby any image which is aligned on the screen 20 with the index 21 thereof is centered with respect to the central axis of the mirror 99. Conversely, if a signal is out of alignment with index 21 by a predetermined amount, then such signal is out of alignment with the central axis of the mirror by the same predetermined amount. Thus, two components of any image passing from the index ruler 13 are generated, one of such components passing to the screen 20 and index 21 therefor, and the other of such components passing through the prisms 96 and 97, lens 98 onto the oscillating mirror 99.

The screen 20 and index 21 associated therewith, and the oscillating mirror and prism arrangement, as described above, are carried by the frame C supported on and movable with toothed racks 22 and 45. Thus, carriage C is movable to and fro in the direction of the arrows presented adjacent thereto on rack 45. A micrometer device including the wheel F is provided for manually moving the frame C. The micrometer device is so adjusted that when the scale 24 carried thereby is aligned in the zero position with the vernier 25, the movable frame C which is moved through cooperation of wheel gear 23 with rack 22, maintains the index 21 of the corresponding screen in a position where the image of any index mark on scale 13 is aligned with index 21 when the support 1 has reached a position corresponding exactly to such index mark. To understand the exact positioning, consider reference pointer 27 carried by support 1 and the scale 26 associated therewith. The reference or pointer 27 carried by the support passes index mark after index mark on the observation scale 26 as the support moves. When the pointer 27 is exactly aligned with any index mark on scale 26 and when the micrometer is set to the zero position, then the image being received from the scale 13 through the optical system will be aligned exactly with the index 21 of the screen 20 and will also be aligned exactly with the optical axis of the oscillating mirror 99. Thus, when the micrometer is set in the zero position, i.e. with the scale carried by the drum F aligned in zero position with the vernier scale 25, the image passing from the scale 13 will be disposed in alignment with the index 21 of the screen 20 and with the optical axis of the oscillating mirror 99. Accordingly, it is known in the system that an image of an index mark on scale 13 falls on the index 21 and is aligned with the optical axis of the oscillating mirror 99, when the support 1 is located at an exact index position, i.e. with the reference pointer 27 carried thereby aligned exactly with a given index mark on the observation scale 26. This condition of alignment serves as the basis for operation of the fine adjustment portion of the over-all system provided by the invention.

When such alignment exists, not only is the image of an index mark from scale 13 aligned with the index 21 to thereby give a visual indication of exact alignment, but the image, as explained, is in alignment with the optical axis of the oscillating mirror 99. Such mirror sweeps such image across a slit 101 in a screen 100 disposed in front of a photocell 47, as shown, whereby the image causes repeated impulses to be generated by the photocell 47. When the exact alignment discussed above exists, such pulses occur in regular sequence, i.e. the time between pulses is equal. The condition of equal timing between the pulses, or the condition of a predetermined time sequence of pulses generated by the photocell 47, is utilized to produce control signals which serve to operate a fine adjustment drive of the system.

Assume for the moment that the support 1 is not positioned with a given index mark on scale 13 located in alignment with a standard. The image of any one of the index marks on scale 13 which is transmitted to the mirror 19 and thereafter to the screen 20 or oscillating mirror 99 would not, under these circumstances, be in alignment with either the index 21 or the oscillating central axis of the mirror 99. Accordingly, it would be visually seen that the machine had not reached a predetermined aligned location and, moreover, the oscillating mirror 99 would not cause equally-timed signals $i_1$ to be generated by the photocell 47. This condition of unequally-timed signals is used by control equipment, which here comprises detector means CE to produce an output $i_2$ which causes movement of the support 1 to a position of alignment. As the table reaches the position of alignment, then the sequence of pulses $i_1$ becomes equally timed, and the support is stopped. This is the operating principle utilized by the fine adjustment section of the invention.

Assume again for the moment that the support 1 upon initial setting of the "repeat positions" has been moved to a coarse position and has also been adjusted by hand or otherwise whereby it is located with the index marks carried thereon in exact alignment with the predetermined standard, i.e. with the pointer 27 aligned with a given index mark on the scale 26. This is an exact alignment, we are assuming. At this instant, the micrometer F is set at its zero position, and at such instant the image being passed through the optical system will coincide with the index 21 of the screen 20 and the central axis of the oscillating mirror 99.

Now, assume that the programming system starts an automatic positioning operation and that the coarse adjustment control moves the table toward the predetermined repeat position of alignment assumed in the preceding paragraph. As explained, the coarse adjustment section of the system will not move the support normally to an exact position wherein the table is aligned with an exact reference. It will move it almost to such position but short of a position of exact alignment by a distance less than the space between index marks. At this time, according to the invention, the fine adjustment section of the system takes over control and causes the support through the power or drive means to move slowly toward the position of exact alignment. As the table moves toward the position of exact alignment, the pulses $i_1$ generated by the photocell 47, receiving an image of the next index mark on scale 13, begin to approach an equal time sequence. As the support reaches alignment, i.e. as the support reaches a position where the image of one of the index marks on scale 13 is aligned with the index 21, then the pulses $i_1$ become equally timed.

Now, the detector means CE provides the output $i_2$ which is fed to two current-sensitive relays RV and RE. The detector means CE and the current-senstive relays RV and RE are connected in the circuit, or "operated," when the coarse adjustment section stops operating, i.e. when the switching amplifier RC of the coarse adjustment section cuts off the power to the motor $E_1$. As explained in more detail below, a switching box CT is provided whereby the same switch, which can be of conventional design and which cuts off the power to the motor $E_1$ when the table reaches the coarse adjustment position, serves to energize the components of the fine adjustment section whereby such components take over control of movement of the support. Thus, as the coarse adjustment system brings the support within the distance between index marks of the predetermined position, the same releases control of the support to the optical system. The optical system, through detector means CE and current-sensitive relays RV and RE, causes the motor $E_2$ to drive the table slowly at first through the speed changer V towards the position of alignment or "repeat position." As the current impulses $i_1$ generated by the optical system and flowing out of the photocell 47 become more closely equally timed, the output $i_2$ of the detector means CE diminishes. Once this output diminishes to a predetermined value, the current-sensitive relay RV operates to switch the speed reducer V to a slower operating speed. Thus, the support approaches the position initially at a speed governed by the motor $E_1$, and then approaches it at a speed governed by the motor $E_2$, and then the support approaches the exact alignment position at a still lower speed governed by the speed reducer V. After the power means has been switched for operation to the lowest of all speeds, the pulses $i_1$ leaving the photocell 47 eventually become equally spaced in time. At such point, or at substantially such point, the output of the detector means CE diminishes to a minimum or zero value. At this time, the current-sensitive relay RE serves to cut off the power to the motor $E_2$ and at the same time to apply a brake FR to the drive system.

The particular arrangement of the lens and mirror system used for directing an image of an index mark from the scale 13 to the index 21 and to the oscillating mirror 99 may vary in accordance with the particular type of operation to be performed. In any event, however, the oscillating mirror 99 is preferably driven by an oscillating motor generally designated by the numeral 102, which motor, in conventional manner, includes a permanent magnet field 102(a) and an oscillating rotor element 102(b) which is fed with alternating current via leads 103(a) which extend from the secondary of transformer 103. The primary of transformer 103 is coupled across one phase of the input supply R so as to supply an alternating current and thereby oscillating drive signal for the coil 102(b). The particular sensing expedients, namely, the photocell 47 and detector means CE can comprise any one of a number of types of known expedients which perform the function of developing a series of pulses, and producing an output signal proportional to the timing between such pulses, respectively. For example, these particular expedients can correspond to those shown and described in British Patent No. 686,274, British Patent No. 684,435, or United States Patent No. 2,848,921. Of course, current sensitive relays RE and RV can be of any well-known type which is sensitive to current level.

Although not specifically mentioned above, it will be noted that preferably the scale 13 is mounted in a recess on the support 1 so as to be longitudinally adjustable by turning of the adjustment knob 87 carried in a threaded block disposed at one end of the scale. Similarly, the pointer 27 is preferably carried on an adjustable support 74 so that such pointer may be positioned, through rotation of the knob 32, to initially set the various elements in desired alignment.

Figure 4:
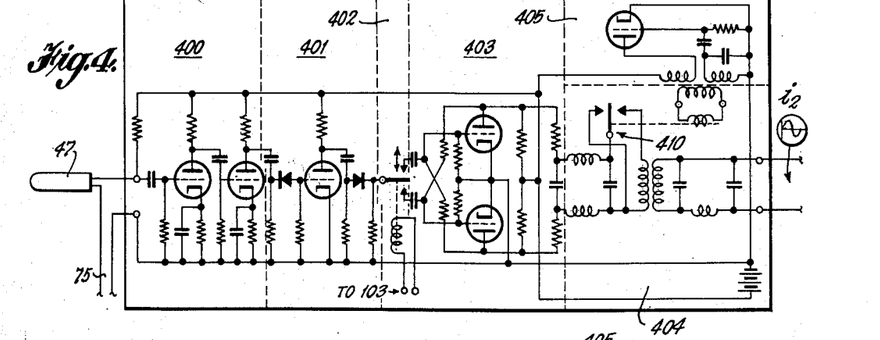
FIGURES 4, 4a and 4b are schematic circuit diagrams presenting different exemplary networks which can be utilized as a detector means component of the system of FIGURE 1.
Figure 4A:
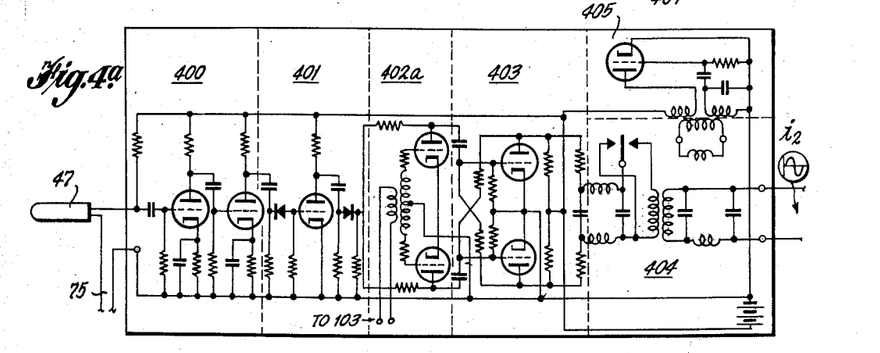
Figure 4B:
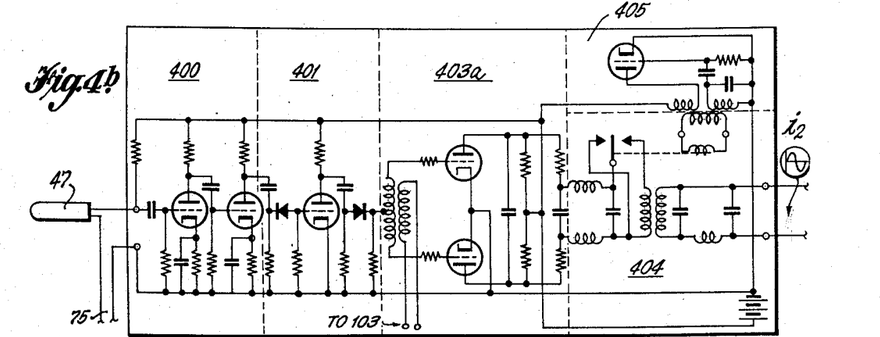

The detector means CE, as explained, can be of any conventional form. However, it has been found that the standard arrangements presented in FIGURES 4, 4(a) and 4(b) are particularly satisfactory. By referring to FIGURE 4, it will be noted that the detector means shown therein comprises six stages, indicated by the numerals 400 through 405 inclusive. The input stage 400 consists of an amplifier arrangement constructed in accordance with United States Patent No. 841,387 and No. 879,532. Amplifier section 400 feeds the pulse shaping transformer section 401 which comprises a circuit constructed in accordance with United States Patent No. 2,448,718. The output of the pulse shaping transformer section is fed to a standard switching section shown as comprising a polarized relay, and designated as section 402. Coupled to the polarized relay section 402 is a bistable multivibrator section 403 comprising a circuit constructed in accordance with British Patent No. 148,582. The multivibrator circuit feeds the output section which comprises a series of filters. This output section is generally designated by the numeral 404 and includes filters such as shown and described in United States Patent No. 1,227,113. A polarized relay generally designated by the numeral 410 is incorporated in the filter section 404, and this polarized relay is driven by a conventional oscillator section 405 comprising an oscillator circuit such as shown and described in United States Patent(s) to De Forest issued in 1912.

FIGURE 4(a) presents a circuit which is substantially identical with that presented in FIGURE 4, but wherein the polarization relay section 402 of the circuit of FIGURE 4 is replaced with a conventional electronic switch section designated by the numeral 402(a). The circuit of FIGURE 4(b), similarly, corresponds to the circuit of FIGURE 4, but in the system of FIGURE 4(b), the detector means CE incorporates a thyratron flip-flop type circuit 403(a) such as shown in British Patent No. 686,274. The arrangement of FIGURE 4(b) eliminates the necessity for a switching section.

It will be noted that in FIGURES 4, 4(a) and 4(b), the input to the detector means network is shown as coming from the photocell 47, and the output of the network is shown schematically as the signal $i_2$. Moreover, it will be noted that the drive for the switching section of FIGURES 4 and 4(a), and the drive for the thyratron flip-flop of FIGURE 4(b) is obtained from the primary of a transformer coupled with the input transformer 103 as so indicated.

While the various electronic and optical expedients discussed hereinabove may take various forms, as suggested, it is important to note that the overall programming system provided hereby, comprises a combination of means which serve initially to store information representative of a given repeat position, and then, ultimately, to position a movable support to the exact repeat position. It is also important to note that the foregoing discussion is based on the assumption that the optical system was set to stop the support with an index mark in alignment with a predetermined standard, i.e. with the pointer 27 aligned exactly with one of the index marks on the ruler 26 at a given position between index marks, and with the image from an index mark on scale 13 aligned with the index 21 and the central oscillating axis of the mirror 99 when the micrometer was set in a given position.

*Automatic Positioning of Optical Reading System*

If all of the "repeat positions" were to be made with the support aligned with one predetermined standard, then there would be no need for adjusting the optical system or the frame carriage supporting the index 21 and the oscillating mirror 99. However, as should be appreciated by those of ordinary skill in the art, in many, if not in most instances, it is not only desired, but necessary, to stop successively at precise points located at differing positions between index marks.

To achieve control over the support whereby it can be stopped at a predetermined exact position between two index marks, the micrometer and movable carriage C adjusted thereby are provided. Suppose that it is desired to move the table .2 mm. short of or past a given reference mark. If this is the case, then the image of an index line on the scale 13 would coincide with the index 21 on the screen 20 only if the index 21 were adjusted .2 mm. multiplied by the enlargement factor of the optical means 14 from the zero position thereof with a given index mark. Thus, if the index 21 is moved .2 mm. in the desired direction from the zero position, then the image from the scale 13 will only be in alignment with the index 21 of the screen 20 when the support has moved .2 mm. past the standard aligned or zero position, for example. At the same time, when the index 21 is moved past the aligned position, the carriage C carrying the oscillating mirror 99 and equipment associated therewith are moved past the aligned position by the same amount. Thus, by offsetting the optical system or optical reading means including the index 21 and the oscillating mirror 99, the support has to move to the "offset position" in order for the image projected from the scale 13 and reflected by the mirror 19 to coincide with the index 21 and the optical axis of the oscillating mirror 99. Accordingly, by offsetting the optical reading means any predetermined amount, the exact position of the support between two reference standards can be preset.

It should thus be apparent that if the drum F is rotated whereby the scale 24 carried thereby, or the zero mark thereof, is aligned with a non-zero indicia on the vernier 25, then the optical reading means is offset by a selectable amount. The movement of the support will thus, after the coarse control stops operating, be controlled by the optical means, past the zero or exact alignment reference point by an amount predetermined by the setting of the scale 24 with reference to the vernier 25 and the resultant longitudinal adjusted setting of the movable carriage C carrying the optical reading means.

If each operation was to be performed either at one of the index mark zero positions (i.e. in a position where one of the index marks was aligned with a standard), or if each operation to be performed was to be carried out at an equal predetermined distance different from the aligned standard position (i.e. with the same "offset adjustment"), then it would only be necessary to preset the micrometer F to one position which would serve as the only "repeat position" for the optical control system after the coarse control system had transferred control of movement of the support to the optical control selection of the system. However, again in many instances, if not most instances, it is desirable and usually necessary to position the movable table in one instance, for example, .2 mm. from a standard position, and during another operation .4 mm. from a standard position, and in another operation .6 mm. from a standard position. Thus, where a plurality of "repeat positions" are to be preset with the optical control section, the invention provides means for automatically causing the micrometer means to adjust the movable carriage C for the optical reading means whereby such reading means is in a predetermined reading position for each operation to be performed. For example, for one operation the optical reading means may be set with the scale 24 of the drum F in alignment with the zero mark of the vernier scale 25. For another operation the zero mark of the scale 24 may be offset .4 mm. from the zero mark of the vernier scale 25. For the next operation the zero mark of the scale 24 may be offset .6 mm. from the zero mark of the vernier scale 25.

In order to provide for automatic repeat controlled by exact different positioning of the optical system, means are provided for automatically positioning the micrometer, or actually the movable carriage C, whereby the optical reading means is in a position when the support reaches the predetermined locations, where the image protected from the scale 13 will be in alignment with the index 21, or more important with the optical axis of the oscillating mirror 99, so that such mirror causes pulses of an equal time sequence to issue from the photocell 47.

According to the invention, and as should be apparent from the foregoing discussion, the movement of carriage C to a plurality of preselectable positions, or "repeat positions," requires the same type of governing control as the movement of the support 1 to the different coarse positions. In other words, the coarse adjustment section described hereinabove serves to move the support 1 to predetermined coarse positions, and then the optical means takes over. Certain components of the optical means must be moved to predetermined "repeat positions" in order to provide for exact position readings. Thus, the movable carriage C of the optical means must be controlled in essentially the same manner as the movable support. Since the operations are essentially the same, the same means which is used for coarse adjustment of the support are used to position the optical reading means. The optical reading means is highly accurate, and provide for extreme accuracy for controlling the stopping of the movable support 1. Thus, while the "coarse" adjustment section used for controlling movements of the support is not sufficient to yield extreme accuracy in positioning thereof precision of about $10^{-4}$ m. since the total displacement of the support is approximately of the order of a meter. Still this same "coarse" adjustment is sufficient for positioning the movable carriage C of the optical means with a precision of about $1.6 \times 10^{-3}$ mm. since the displacement of the carriage is of about 16 mm. displacement corresponding, taken account for the enlargement factor of the optical means 14 to the interval between two dashes of the precision ruler. Thus in fact the carriage C is positioned within at least $10^{-7}$ m. of the exact desired stop position.

Accordingly, the invention provides for using almost a duplicate of the coarse adjustment control section as the control system for repeatedly positioning the movable carriage C of the optical system. A signal generator *es* produces sinusoidal signals *cf* in response to movement of the movable rack 45 secured to carriage C, which signals are transformed into pulses *if* by the pulse shaping network. During initial setting of a repeat position a pulse series *ae* is stored on a magnetic drum *m* via the recording heads $te_1$–$te_n$ in a particular channel selected through setting of selector switch *se*. After the predetermined positions have been stored as pulse series in respective channels *p* on the magnetic memory member *m*, and it is desired that the system move the optical reading means to a predetermined "reading position," then the stored signals *im* picked off the memory member *m* by means of pick-up heads $tl_1$–$tl_n$ are fed to a phase comparator *cp* through selector switch *sl*. The phase comparator *cp* compares the repeat series *im* with the instantaneous signals *if* generated by the phase switch *sl*. The phase comparator *cp* compares the repeat series *im* with the instantaneous signals *if* generated by the phase shifter *es* and shaped into pulses by the pulse network *ae*. The output *dm* of the phase comparator *cp* is fed to an amplifying means *rc* which provides a drive for a motor *mf* which in turn, through the gear 61, drives the movable rack 45. The comparator means *cp* as explained hereinbelow, like the comparator means CP, includes an oscillator component. The invention provides for utilizing this oscillator component to provide a control voltage for one field of the motor *mf*. Thus, in accordance with the invention, the phase comaparator *cp* produces sinusoidal voltage *dm* representative of the phase difference between the series of instantaneous pulses *if* and the series of repeat stored pulses *im*. Such phase comparator also produces a voltage of constant amplitude *em* which is used to feed the other field of the motor *mf* through amplifier *rc*. The control system for the optical reading means, or for moving the optical reading means to the "repeat positions," operates in the same manner as the coarse adjustment section of the system provided for the movable support 1.

Generally, the components of the section of the system which governor automatic positioning of the index means and reading means correspond exactly with the components used in the coarse adjustment section of the system. For this reason, and for purposes of clarity, that section of the system which serves to automatically position the optical reading components can be considered as an auxiliary positioning system. Such auxiliary positioning system includes the network, components, expedients, and arrangement enclosed within the phantom box RM of FIGURE 1.

The components of the auxiliary positioning system RM can be of any conventional form and type without departing from the scope and spirit of the invention. Preferably, however, the signal generator *es* is a duplicate of the signal generator ES used in the coarse adjustment section of the system. It comprises a phase shifter having a rotor movable with the shaft 60 in response to rotation with the gear 61. The gear 61 cooperates with the teeth on rack 45, and thus angular positioning of the rotor of phase shifter *es* results in the production of a sinusoidal signal *cf* representative of the instantaneous position of the rack 45.

In the auxiliary positioning section of the system, as in the coarse adjustment section thereof, means are provided for synchronizing the signals produced by the phase shifter *es* with the signals picked up from the memory member *m*. Accordingly, a shaft 62 coupled with the memory member *m* serves to drive the rotor of an alternator *a*, and the field of the alternator is coupled via lines 63 with the field of the phase shifter *es*. The memory member *m*, like memory member M, comprises an elongate cylindrical support 37' having a magnetic surface 36' thereon, and is driven by the synchronous motor *ms*. A series of recording heads $te_1$–$te_n$ and a series of pick-up heads $tl_1$–$tl_n$ are provided on opposite sides of the surface of the memory member *m* to respectively record and pick up repeat position series of signals. Thus, the auxiliary memory means is essentially a duplicate of the memory means incorporated in the coarse adjustment section of the system, and the detailed explanation of the construction of such memory means set forth above is applicable here.

In the auxiliary positioning section RM of the system, the phase shifter *es* and the pulse forming network *ae* serve together as means for generating instantaneous signals representative of the instantaneous position of the rack 45 and carriage or frame C supported thereon. The pulse forming network *ae* is a duplicate of the pulse forming network AE incorporated in the coarse adjustment section of the system. The description of component AE presented hereinabove is therefore applicable to the component *ae*.

The auxiliary phase comparison means *cp* is connected with the auxiliary pulse forming network *ae* and the auxiliary memory means so as to receive two series of signals, namely, a series of instantaneous pulse signals *if* from the pulse forming network *ae*, and a series of repeat positions signals *im* from the memory means. The signals *if* are delivered via the line 69, whereas the signals *im* are delivered to the phase comparison means *cp* via the line 68. Of course, during the initial operation, when repeat position signals are being stored, the switch *j* is closed so as to couple the pulse forming network *ae* with respective recording heads $te_1$–$te_n$ via the selector switch *se*. The switch *j* is mechanically linked with the switch J of the coarse adjustment section through the mechanical connection schematically represented and designated by the numeral 105 whereby depression of the pushbutton *k* serves to simultaneously connect both the memory means of the coarse adjustment section, and the auxiliary memory means with their respective associated signal generating means. In this manner, once the movable support has been moved to an exact repeat position, repeat position series of signals can be simultaneously recorded on the memory member M and the memory member *m*. To provide for storage of repeat position signals indicative of an exact repeat position in corresponding channels on the memory member M and the memory member *m*, the selector switches SE and *se* are mechanically linked together by the mechanical coupling schematically represented and designated by the numeral 104. The mechanical coupling 104 preferably carries an indicator N which cooperates with an associated scale to indicate the particular channel being used on the respective memory members M and *m*. It will be noted that the mechanical link 104 also connects the selector switches SL and *sl* with the selector switches SE and *se* so that all of the selector switches are simultaneously movable to respective positions. Accordingly, the indicator N can be set in a given position to record signals onto the respective memory members in respective channels thereof, and then, when automatic operation is desired, it can be set to the respective position so that the desired series of signals is fed from the memory members M and m to the respective phase comparison means CP and cp.

As indicated above, the auxiliary phase comparison means cp is essentially a duplicate of the phase comparison means CP. However, the auxiliary phase comparison means has a two signal output, namely, one signal dm whose amplitude varies in accordance with the respective phase difference between signals fed thereto, and a constant amplitude signal em. The fact that the phase comparison means cp produces the output em in addition to the output dm causes no particular problem, since conventional phase comparison means normally incorporate an oscillator component. More particularly, if reference is again made to FIGURES 2(a) through 2(c), it will be remembered that the phase comparison means CP shown therein which can be used in the coarse adjustment section of the system incorporates an oscillator section designated by the numeral 304. This oscillator section produces a constant amplitude sinusoidal voltage, and accordingly, in the auxiliary system, two leads are coupled with this oscillating section so that a constant amplitude signal em can be derived therefrom. More specifically this oscilaltor section is utilized in the auxiliary phase comparison means cp, to produce the sinusoidal signals em of constant amplitude.

Figures 5A, 5B:
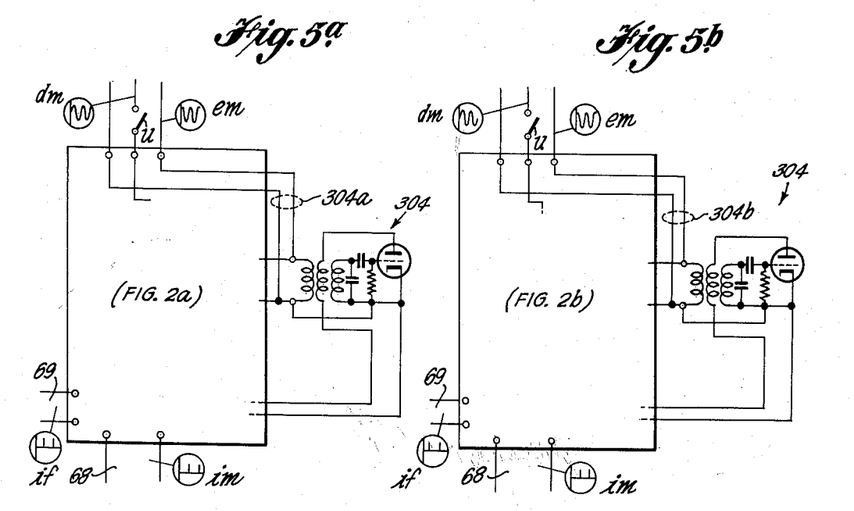
FIGURES 5a through 5c, inclusive, are schematic circuit diagrams of exemplary comparison networks which can be utilized in the auxiliary positioning arrangement forming part of the fine adjustment section of the system of FIGURE 1.
Figure 5C:
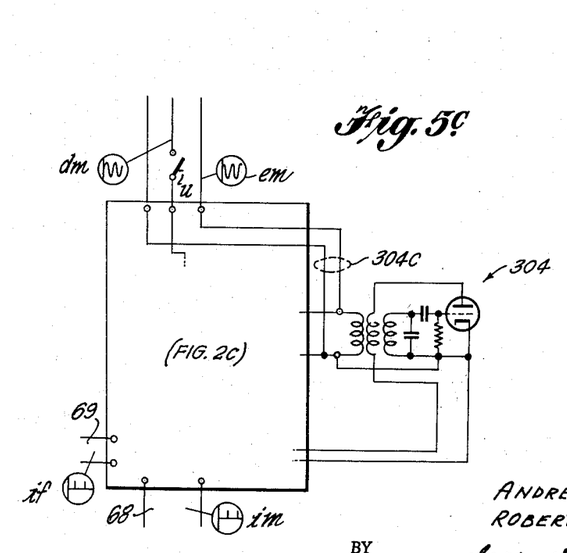

If reference is made to FIGURE 5(a), it will be noted that the network shown therein corresponds identically with the network shown in FIGURE 2(a). However, FIGURE 5 represents a suitable network which can be incorporated in the system as the phase comparison means cp. The network of FIGURE 5(a) includes a pair of leads 304(a) extending from the oscillator section 304 thereof. These leads carry the constant amplitude sinusoidal signal em. Similarly, the oscillator section 304 of the system of FIGURE 5(b) includes a pair of leads 304(b) which carry the constant amplitude signal em from the oscillator section 304 thereof, and the phase comparison network of FIGURE 5(c) includes a pair of leads 304(c) which carry the constant amplitude sinusoidal signal em from the oscillator section 304 thereof. It will be noted that FIGURE 5(b) corresponds identically with FIGURE 2(b), and that FIGURE 5(c) corresponds identically with FIGURE 2(c), the only difference between the figures being in the provision of the additional pair of leads utilized to carry constant amplitude output signals em from the respective oscillator sections.

The two output signals dm and em produced by the phase comparison means cp are passed to an amplifier stage rc wherein such signals are amplified. The output from the ampulifying means rc includes an amplified signal dm and amplified signal em. The signal dm passes from the amplifier rc via the line 71 to the control phase of the two phase motor mf, whereas the constant amplitude signal em passes via the leads 70 to the excitation phase of the motor mf. Of course, the particular signal which is used for the control phase and the particular signal which is applied to the excitation phase of the rotor mf can be reversed but in any instance, it is important to note that one signal fed to such motor, namely the amplified signal dm is variable in magnitude depending on the phase difference between the series of signals fed to the phase comparison means cp whereby it decreases to zero when a repeat position is reached. Thus, one signal fed to the motor is nullified when a repeat position is reached, and the motor stops its drive.

Motor mf as shown, carries a sprocket on the drive shaft thereof which cooperates with the gear 61 carried on shaft 60 extending from the phase shifter es. The gear 61 also cooperates with the rack 45 whereby the gear 61 and rack 45, as well as the phase shifter es are driven by the motor mf.

Figure 6:
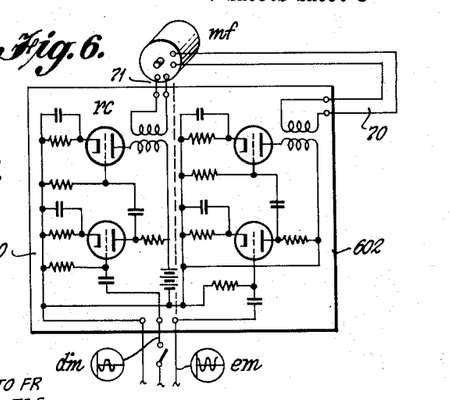
FIGURE 6 is a schematic circuit diagram of an exemplary amplifier network which can be associated with and controlled by the phase comparison networks presented in FIGURES 5a through 5c, inclusive, in operation of the system hereof.

The amplifier stage rc can be of any conventional design, but preferably takes the form shown in FIGURE 6. Such amplifier includes two amplifier sections generally designated by the numeral 600 and 602 respectively. The amplifier is constructed in accordance with the teachings of United States Patent No. 841,387 and United States Patent No. 879,532. For a detailed explanation as to the manner in which an amplifier network can be suitably coupled with a drive motor to control operation thereof, as in the instant system, attention is directed to United States Patent No. 2,760,131, and particularly the explanation with respect to FIGURE 4 thereof.

*Operation of the Control Switching Box CT*

It has been assumed hereinabove that the control switching box designated as CT serves in response to signals from the amplifier RC, to disconnect power from the motor $E_1$ or stop control of the overall system by the coarse adjustment section, and to connect the motor $E_2$, brake FR and gear box V with the fine adjustment control section of the system. The switching operations performed by the device CT are conventional operations, and any suitable form of switching means may be incorporated to perform the desired functions.

Figure 7:
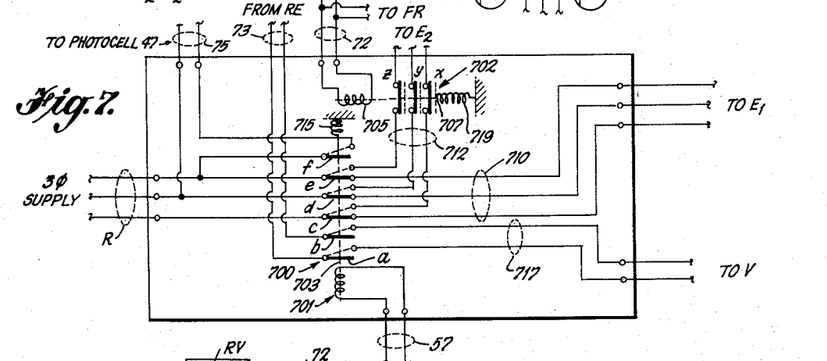
FIGURE 7 is a schematic diagram of an exemplary switching arrangement which can be incorporated as part of the switching control means of the system of FIGURE 1.

For example, consider FIGURE 7 presenting schematically two multiple contact relay operated switches 700 and 702. The energization coil 701 of the switch 700 is coupled via the leads 57 with the amplifier RC, and such coil serves to mechanically operate the mechanical coupling element schematically represented and designated by the numeral 703. Similarly, the energization coil 705 of the switching means 702 is coupled to the relay RV, and the mechanical link 707 of the switching means 702 is actuated by the coil 705.

In FIGURE 7, the contact elements of the respective switching means are shown in solid lines in the positions which they occupy during initial operation of the system and are shown in dotted lines in the position which they occupy thereafter. Thus, initially the three phase supply line is coupled by the contact elements c, d, e of switching means 700 with the leads 710 extending to the motor $E_1$. At this time, no power is passing to the motor $E_2$ because the leads 712 are not coupled with the three phase supply R.

Under the operating conditions set forth in the preceding paragraph, the programming system of the invention causes the support 1 to move toward a repeat position. As the support 1 approaches the repeat position, the output signal from the amplifier RC decreases, as explained, to a predetermined minimum which is sufficient to deenergize the coil 701 of switching means 700. When this occurs, the mechanical link 703, under the action of the spring 715, moves upwardly, thereby disconnecting elements c, d, and e of switching means 700 from the leads 710, and connecting the same with the leads 712. This results in supplying power from the three phase supply lines R to the motor $E_2$. It will be noted here that the switching means 702 has three contact elements x, y, and z coupled in the lines 712. It should also be noted that when the coil 701 is deenergized, the switching element f of switching means 700 assumes the dotted line position shown in FIGURE 7, and the previously existent gap in leads 75 across one phase of hte three phase supply is short-circuited. Also, when the coil 701 is deenergized, and the link 703 moves upwardly, the contact elements a and b of the switching means 700 serve to couple the leads 73 with the leads 717 passing to the gear box V.

Once the coil 701 is deenergized in the manner explained, and the motor $E_2$ is energized, then the support 1 is caused by the programming system of the invention to more slowly approach an exact repeat position. During this interval, control of the system is governed by the index means and reading means, or more particularly the optical section of the system designated in FIGURE 1 within the phantom box AA. It will be remembered that while fine adjustment of the support 1 is taking place, the detector means CE receiving pulses from the photocell 47, is producing an output $i_2$ which ultimately decreases to a value where current sensitive relay RE is deenergized. Upon deenergization of current sensitive relay RE, the gear box V no longer receives what may be called a "maintaining signal" and as a result, such gear box in conventional manner switches to a lower speed. More specifically, at this time, the motor $E_2$ ceases to drive the worm 34 directly, and instead drives the same through the gear box V, for example. Relay RE can thus be deemed a clutch operating relay in that it serves to operate a clutch in the gear box V which couples the motor $E_2$ through suitable gearing, for slower drive of the worm 34.

After the relay RE has been deenergized, and the motor $E_2$ serves, through the gear box V, to drive the worm 34 at an even slower speed, the support 1 continues to approach the exact repeat position. As a position of exact alignment is reached, the output of the detector means CE decreases to such a value that the current sensitive relay RV is deenergized. At this time, no signal is fed through such relay to the energization coil 705 of the switching means 702 or to the brake FR. Accordingly, the brake FR grips the shaft carrying the worm 34 and stops rotation thereof. Simultaneously, the mechanical link 707 of the switching means 702 moves to the right as shown; under the action of the spring 719 and the motor $E_2$ is uncoupled from the three phase supply R.

Figure 8:
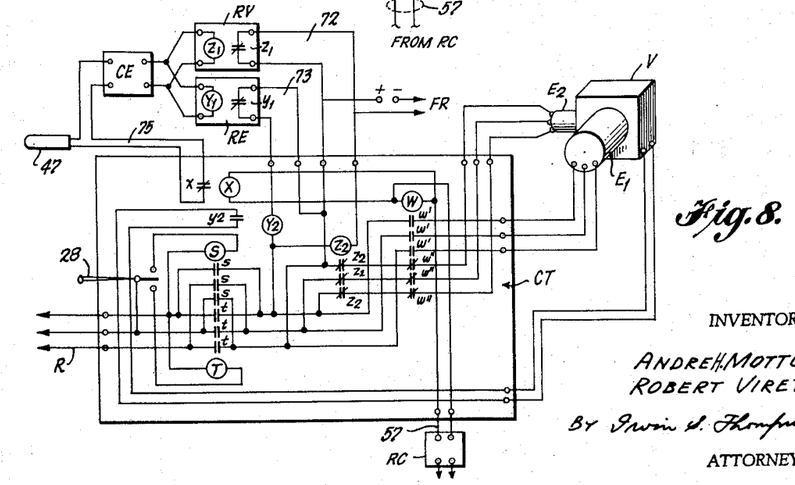
FIGURE 8 is a schematic circuit diagram of the preferred form of switching arrangement utilized in the system of FIGURE 1 and presents the preferred connections of such arrangement with other components of the system.

While FIGURE 7 presents a very simple form of switching means which may be used in the control switching device CT, preferably such device is constructed in accordance with the network presented in FIGURE 8. By reference to that figure, it will be noted that the exact connections between the amplifier RC, the motors $E_1$ and $E_2$, the gear box V, the relays RV and RE and the photocell 47 are presented fully. The control box CT includes the various relay switches X, $Y_2$, W, $Z_2$, and S and T. The contacts shown within the switching box CT of FIGURE 8 are designated respectively by small letters corresponding to the capital letter used to designate the relay operating element thereof. However, in the instance of control by the relay W, it will be noted that the respective contacts are indicated for two positions, one position being designated as $w'$ and the other position being designated as $w''$. Also, in FIGURE 8, the internal construction of relay RV and RE is presented schematically.

The system of FIGURE 8 is somewhat more complex than the system of FIGURE 7, but it provides for more advantageous results in that the switching arm 28 is provided as part of the switching control box CT whereby the switching arm 28 can establish initial connections so as to fully power the programming system in its entirety.

The programming system of the invention, in addition to incorporating the various switching devices and means discussed hereinabove, also includes a pair of safety switches U and $u$ which are linked together by the mechanical connections schematically represented and designated by numeral 53. This mechanical connection is operable through the handle Q so as to connect and disconnect the respective phase comparison means CP and $cp$ with their associated amplifiers RC and $rc$. During normal operation, the switches U and $u$ are, of course, closed so that the output of the respective phase comparison means is fed to the respective amplifiers.

However, in certain instances, it may be desired to operate the system components, without supplying signals to the respective amplifiers RC and $rc$. For example, means are provided for permitting erasure of stored signals from channels on the memory members M and $m$. Specifically, a pair of leads 76 extends from a suitable D.C. supply (not shown) to the leads 58, and similarly a pair of leads 77 extend from the same supply to the leads 68. When it is desired to erase signals stored in all or particular channels on the memory members M and $m$, then the handle Q is moved to the right as shown, and the switches U and $u$ are open. Thereafter, the push button S is depressed, and the switches W and $w$ are simultaneously, through the action of mechanical link 106, closed so that leads 58 and 68 respectively are coupled with the source of D.C. In this instance, the D.C. signal passes through the selector switches SL and $sl$ to one pair of the respective pick-up heads $TL_1$–$TL_n$ and $tl_1$–$tl_n$. When the signal is applied to such pick-up heads, it erases information stored in the particular channel. Naturally, during this operation, it would not be desirable to feed a signal to the control switching device, but it is desirable to maintain at least the memory means in operation.

It will be appreciated that the connections provided in the system for causing erasure can be so operated so as to erase each channel on the respective memory members progressively, or so as to erase any given channel by a desired setting of the selector switches SL and $sl$, or more specifically, by a desired setting of the pointer $n$.

*Application of the Programming System to a Machine Tool*

At the outset of the present specification, it was suggested that the programming system provided hereby finds particular application when utilized for the control of a machine tool. The machine tool can, for example, comprise a jig boring machine such as that presented in some detail in FIGURES 9 through 13, inclusive. Such machine comprises a table or movable support 1 having depending guides adapted respectively to slide over the rail 2 and within the rail slot 3. The rail and rail slot are provided in a conventional frame 4, and the support 1 is adapted to carry a workpiece P into which bores 5, 6 and 7 are to be machined by means of a drill bit 8. The drill bit 8, according to conventional practice, is carried in a spindle 9 rotatable depending from a conventional press head 10 which is movable transversely with respect to the support 1 by virtue of the cooperation between the guide means 11 and the lateral slide rails 12 carried on the frame 4.

Figures 9, 10:
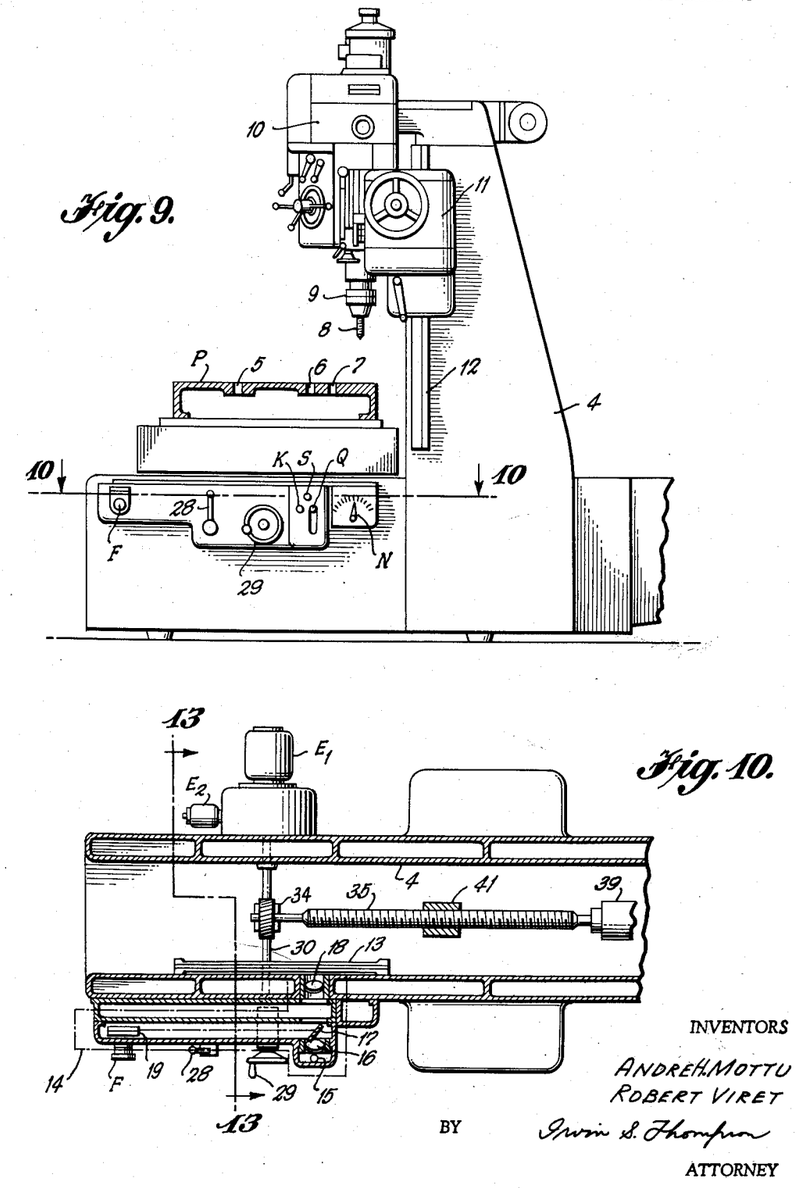
FIGURE 9 is a side view of a jig boring machine of the type adapted to be controlled by the system provided by the instant invention.
FIGURE 10 is a sectional view taken on the line 10—10 of FIGURE 9, and presents the preferred arrangement of the overall drive means utilized in the system of the invention, as well as the preferred arrangement and disposition of the optical image transmitting components of the system when applied to the machine of FIGURE 9.

As best shown in FIGURE 9, the various controls are mounted on a suitable control panel fastened to the side of the base of the frame 4. Such control panel includes the pointer N, the switch Q, the switch S, the switch K, and the power switch 28. Moreover, the micrometer drum F is mounted on such panel, and a handle 29 is provided for enabling manual adjustment of position of support 1.

By referring to FIGURE 10, it will be seen that the handle 29 serves to rotate a worm shaft 30 which cooperates with a suitable worm 34 carried at the left end, as shown, of the main worm drive 35. It will also be noted by reference to FIGURE 10, that the main worm 35 cooperates with the block 41 by virtue of the threaded engagement therebetween. A bearing 39 is provided at the right end of the main worm 35, as shown, and this bearing not only supports the worm 35, but in addition serves as a stop for the support 41.

Of course, as previously explained, the motors $E_1$ and $E_2$ serve, through the gear box V, to drive the main worm 35 in normal operation. By referring to FIGURE 13, it will be seen that the shaft 30 extends into the gear box V, and that the worm 34 carried thereby cooperates through an intermediary gear 34' with the main worm 35 through the cooperating gear 35' carried at the end thereof.

Figure 11:
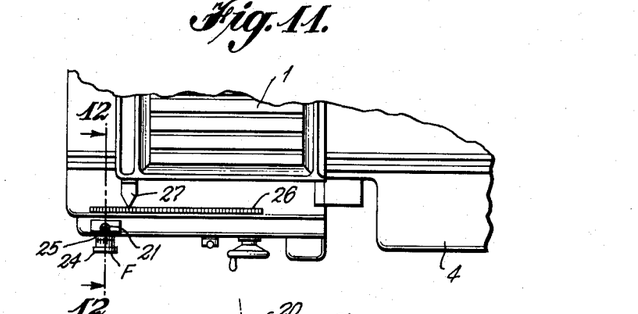
FIGURE 11 is a fragmentary plan view of the control panel area of the machine shown in FIGURE 9.
Figure 12:
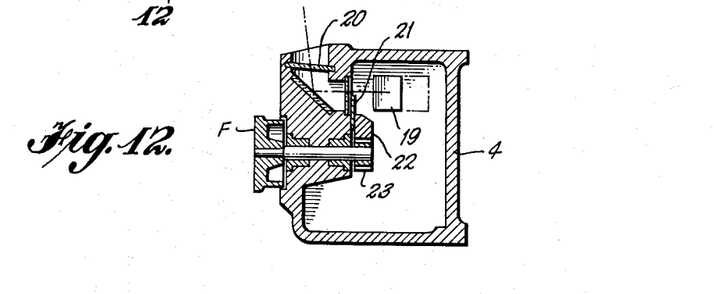
FIGURE 12 is a fragmentary sectional view taken on the line 12—12 of FIGURE 10, and presents the details of construction of the micrometer adjusting means and optical components associated therewith, which are incorporated in the system of the invention.

FIGURES 10, 11 and 12 present the disposition and manner of support of the various optical components of the system. As shown in FIGURE 11, the screen 20 is disposed in an opening onto the top side of the base of the frame 4. The index 21 is carried by a carriage 22 operatively connected to micrometer drum F through gear 23, and the mirror 19, as shown in FIGURE 12, is so disposed as to reflect an image onto the screen 20. The prism 97, oscillating mirror, motor therefor, and photocell and associated components may be disposed in any convenient position within the machine and supported in conventional manner. The disposition of the respective components which form and project the image are, however, preferably supported in the manner shown in FIGURE 10. It appears unnecessary to explain this disposition in detail, since the numerals used in FIGURE 10 correspond with those used in FIGURE 1.

*Conclusion*

After reading the foregoing detailed description of the preferred and illustrative embodiments of the invention, it should be apparent that the objects set forth at the outset of this specification have been successfully achieved. This application is a continuation-in-part of my copending application, Serial No. 692,811, filed October 28, 1957, issued as Patent No. 3,012,452, dated December 12, 1961.

Having described our invention, we claim:

1. An automatic programming system for repeatedly selectively positioning at a plurality of exact locations, a movable support carrying indices thereon, said system comprising in combination, selectively operable power means for moving said support at coarse and slower fine adjustment speeds, generator means coupled to said movable support for developing electrical signals having a phase angle that is a function of the instantaneous position of said movable support, memory means for reproducibly storing electrical signals, phase comparison means for producing an error voltage which is a function of the phase difference between two series of electrical signals fed thereto, switching means for coupling said generator means to said memory means to record on said memory means a repeat position series of electrical signals and for coupling said generator means and said memory means to said phase comparison means to feed to said phase comparison means a series of instantaneous position signals from said generator means, and said repeat position series of signals from said memory means, means for producing vernier electrical signals having a characteristic which is a function of the position of said indices relative to a zero position, detector means responsive to said vernier electrical signals for producing an output signal having a magnitude proportional to variations in said characteristic, and control means coupling said phase comparison means and said detector means with said power means, said control means being responsive to said error voltage and said output signal for connecting said phase comparison means with said power means for driving said support at coarse adjustment speed until said error voltage reaches a predetermined minimum value, and then connecting said detector means to said power means for driving said support at fine adjustment speed until said output signal reaches a predetermined minimum value.

2. An automatic programming system as defined in claim 1 wherein said means for producing vernier electrical signals comprises an optical system for producing a sequence of images of one of said indices, variable in time sequence in accordance with the position of said support, and sensing means for producing said vernier signals in response to said sequence.

3. An automatic programming system as defined in claim 2 and further including visual index means cooperating with said optical system to receive an image of one of said indices and define a zero position thereof.

4. An automatic programming system as defined in claim 3 wherein said index means includes micrometer means for positioning said index means.

5. An automatic programming system as defined in claim 3 and further including a movable carriage having said index means and said means for producing vernier electrical signals disposed thereon, and an auxiliary automatic programming system comprising auxiliary power means for moving said carriage, auxiliary generator means coupled to said carriage for developing electrical signals having a phase angle that is a function of the instantaneous position of said carriage, auxiliary memory means for reproducibly storing electrical signals, auxiliary phase comparison means for producing an auxiliary error voltage which is a function of the phase differenece between two series of electrical signals fed thereto, auxiliary switching means for coupling said auxiliary generator means to said auxiliary memory means to record on said auxiliary memory means a repeat position series of electrical signals and for coupling said auxiliary generator means and said auxiliary memory means to said auxiliary phase comparison means to feed to said auxiliary phase comparison means a series of instantaneous position signals from said auxiliary generator means, and said repeat position series of signals from said auxiliary memory means, and auxiliary control means coupling said auxiliary phase comparison means with said auxiliary power means, said auxiliary control means being responsive to said auxiliary error voltage for connecting said auxiliary phase comparison means with said auxiliary power means for driving said carriage until said auxiliary error voltage reaches a predetermined minimum value.

6. An automatic programming system as defined in claim 5 and further including micrometer means for manually moving said carriage.

7. An automatic programming system as defined in claim 6 wherein said generator means and auxiliary generator means each comprise means for generating alternating voltage signals and a pulse forming network for transforming said alternating voltage signals into pulse signals.

8. An automatic programming system as defined in claim 7 wherein said generator means and auxiliary generator means and said memory means and auxiliary memory means each include respectively means for synchronizing operation therebetween.

9. An automatic programming system as defined in claim 8 wherein said power means includes means for moving said support at first and second fine adjustment speeds, and wherein said control means is responsive to said error voltage to operate said power means at said first fine adjustment speed until said error voltage reaches a first predetermined minimum value, and then operate said power means at said second fine adjustment speed.

10. An automatic programming system as defined in claim 9 wherein said power means includes a brake means, and wherein said control means is responsive to a second predetermined minimum value of said error voltage, lower than said first predetermined minimum value for operating said brake means and otherwise stopping operation of said power means.

References Cited in the file of this patent

UNITED STATES PATENTS

| | | |
|---|---|---|
| 2,311,142 | Turrettini | Feb. 16, 1943 |
| 2,475,245 | Leaver et al. | July 5, 1949 |
| 2,537,770 | Livingston et al. | Jan. 9, 1951 |
| 2,880,512 | Fenemore et al. | Apr. 7, 1959 |
| 2,924,768 | Farrand et al. | Feb. 9, 1960 |
| 3,012,452 | Mottu et al. | Dec. 12, 1961 |

FOREIGN PATENTS

| | | |
|---|---|---|
| 343,487 | Switzerland | Feb. 15, 1960 |
| 825,439 | Great Britain | Dec. 16, 1959 |